US005497063A

United States Patent [19]
Day et al.

[11] Patent Number: 5,497,063
[45] Date of Patent: Mar. 5, 1996

[54] FUZZY LOGIC SERVO CONTROLLER

[75] Inventors: Chia Day, Solon; Ernst Dummermuth, Chesterland, both of Ohio

[73] Assignee: Allen-Bradley Company, Inc., Milwaukee, Wis.

[21] Appl. No.: 123,020

[22] Filed: Sep. 16, 1993

[51] Int. Cl.⁶ .................................................. G05B 11/42
[52] U.S. Cl. ........................ 318/610; 318/560; 318/609; 395/1
[58] Field of Search .............................. 318/610, 609, 318/560; 395/1

[56] References Cited

U.S. PATENT DOCUMENTS

| | | | |
|---|---|---|---|
| 3,698,829 | 10/1972 | Kubo et al. | 318/610 |
| 4,081,733 | 3/1978 | Anderson et al. | 318/610 |
| 4,374,349 | 2/1983 | Inaba et al. | 318/568 |
| 4,463,297 | 7/1984 | Bennett et al. | 318/561 |
| 4,488,098 | 12/1984 | Shimonou | 318/561 |
| 4,500,823 | 2/1985 | Walrath | 318/632 |
| 4,507,594 | 3/1985 | Takemoto | 318/615 |
| 4,540,923 | 9/1985 | Kade et al. | 318/561 |
| 4,612,489 | 9/1986 | Gunda | 318/590 |
| 4,727,303 | 2/1988 | Morse et al. | 318/616 |
| 4,841,815 | 6/1989 | Takahashi | 74/866 |
| 4,842,342 | 6/1989 | Takahashi et al. | 303/102 |
| 4,903,192 | 2/1990 | Saito et al. | 364/157 |
| 5,072,357 | 12/1991 | Niessen et al. | 318/609 |
| 5,099,428 | 3/1992 | Takahashi | 318/610 |
| 5,159,547 | 10/1992 | Chand | 364/157 |
| 5,223,778 | 6/1993 | Svarovsky et al. | 318/610 |

OTHER PUBLICATIONS

*Fuzzy Logic* by Bart Kosko and Satoru Isaka, Scientific American Jul. 1993.
*An Introductory Survey of Fuzzy Control* by Michio Sugeno, Information Sciences 36, 59–83 (1985).
Dialog Reprint of *Solving Problems With Fuzzy Logic* by Earl Cox, AI Expert vol. V7 Issue 3, Mar. 1992.

Primary Examiner—Willian M. Shoop, Jr.
Assistant Examiner—Karen Masih
Attorney, Agent, or Firm—John J. Horn; George A. Montanye

[57] ABSTRACT

A method and apparatus for incorporating fuzzy logic into a feedback controller is provided. An error signal and the derivative of feedback or error is provided to the fuzzy logic to develop a proportional and differential signal, the differential signal is subsequently integrated and added to the proportional signal to create a control output of the controller. The fuzzy rules of the fuzzy logic decrease the integral term under situations that might lead to "wind-up".

10 Claims, 3 Drawing Sheets

FUZZY LOGIC SERVO CONTROLLER

BACKGROUND OF THE INVENTION

1. Field of the Invention

This invention relates to controllers such as are used for the control of servo systems or more generally for the control of processes. In particular, the invention relates to an architecture and set of rules for providing fuzzy logic in such a controller.

2. Background Art

Feedback controllers, such as those used for controlling the position of a servo motor, accept a reference input (i.e., a position command indicating the desired position of the motor) and receive a feedback signal (i.e., a signal indicating the actual position of the motor). From these signals, the controller produces a command to the motor or process calculated to bring the feedback signal into closer agreement with the reference input.

For a feedback controller used to control a process, such as fluid level control or temperature control, the reference input indicates the desired output of the process and the controller provides inputs to the process calculated to bring the process output into agreement with the reference input.

In a simple controller, the feedback signal is subtracted from the reference input to produce an error signal and the output of the controller is proportional to the error signal. In more complex controllers, the output is a complex function of the error signal and other signals. The functional relationship between the inputs to the controller and the controller's outputs critically affects the quality of the control as measured in terms of steady state error, overshoot, response time and the controller's ability to handle process nonlinearities such as stiction.

A variety of different functional relationships may be implemented through the use of a Proportional-Integral-Differential ("PID") controller which provides a generalized function which is the sum of: (1) the error signal times a proportional gain factor ("P-gain"), (2) the integral of the error signal times an integral gain factor ("I-gain") and (3) the derivative of the error signal times the derivative gain factor ("D-gain"). This last additive part, D-gain, for practical reasons, may alternatively be a derivative of the feedback signal times a derivative gain factor. Henceforth, these two sources of the derivative signal will be treated as equivalent and used interchangeably.

By adjusting the P-, I- and D-gain factors, a wide variety of transfer functions may be effected which when combined with the physical transfer function of the motor system or process produce the desired system response.

Selecting the proper P-, I- and D-gain factors to produce a desired system response has been the subject of considerable study. If the transfer function of the physical system to be controlled is well known and may be approximated by a linear system, the appropriate P-, I- and D- gain factors may be calculated according to desired tradeoffs by a number of well known methods. More typically, however, the precise transfer characteristics of the physical system are not well known and/or are nonlinear. In these cases, the proper gain factors must be approximated, typically by a human expert applying "rules of thumb".

Fuzzy logic is a well known technique for controlling mathematically ill-understood processes In fuzzy logic, the rules-of-thumb of experts are captured as fuzzy decision rules that are used to approximate the tradeoffs that would be made by a human expert. A useful overview of fuzzy logic is contained in the article: *An Introductory Survey of Fuzzy Control*, by Michio Sugeno, in INFORMATION SCIENCES 36, 59–83 (1985) hereby incorporated by reference.

Generally, fuzzy logic first maps one or more analog inputs to several fuzzy states defined by overlapping membership functions. If the input is temperature, the membership functions might be those of "cold", "tepid" or "hot" and serve to characterize any given input as one of these three types to varying degrees.

Fuzzy logic next applies fuzzy rules to the characterized inputs, the fuzzy rules modeling those employed by a human expert, to map the characterized inputs to output states which are described by output membership functions.

The competing membership functions are then combined, in a third "defuzzifying" step, according to one of several methodologies. A common method of combining the output membership functions is to find their center of mass.

The application of fuzzy logic to PID type controllers, although in principle desirable, faces several obstacles. The first obstacle is determining how the fuzzy logic may be incorporated into the architecture of the controller. Fuzzy logic does not have the capacity to develop integrated and differentiated signals, and to use the fuzzy logic simply to sum these signals together, after they are developed by other circuitry, provides very little benefit.

The second obstacle is the development of the rules that the fuzzy logic follows. The fact that fuzzy logic is to be used provides no guidance as to what rules it must follow.

The third obstacle is that of permitting the fine tuning of the fuzzy logic controller to a particular process preferably on a real-time basis. Reprogramming fuzzy logic is, in general, a time consuming and complex process not well suited to fine adjustments.

SUMMARY OF THE INVENTION

The present invention provides an architecture for implementing fuzzy logic in a PID-type controller and a set of fuzzy rules useful for such a controller when used to control a variety of different processes. A method of fine tuning of the fuzzy logic controller, analogous to the tuning of the gain factors presently available in conventional PID controllers, is also provided.

Specifically, a controller of the present invention includes a comparator for comparing a reference input to the output of the controlled process to produce an error signal. A differentiator receives either the process output or the error signal to create a feedback difference signal. These two inputs of error signal and feedback difference signal are received by fuzzy logic incorporating a set of fuzzy rules to produce a proportional action signal and a differential action signal both being fuzzy functions of both of the error signal and the feedback difference signal. An integrator receives the differential action signal to produce an integrated differential action signal and this integrated differential action signal is summed with the proportional action signal to produce the input to the controlled process.

It is one object of the invention to effectively integrate fuzzy logic into a PID-type controller. Combining the proportional and derivative signal through fuzzy logic prior to integration, provides increased flexibility in constructing fuzzy logic rules which can significantly affect the integral term. As mentioned above, fuzzy logic by its nature cannot store past events and therefore cannot directly provide integration.

In one embodiment, the process input signal has an integral part, and the set of fuzzy rules permit change in the integral part when the differential feedback signal's magnitude is small or if the error is small, but limit change in the integral part when the differential feedback signal's magnitude is moderate.

It is thus another object of the invention to develop a rule that permits the integral term of the process input produced by the controller to be high when the rate of change of feedback is small, and thus to overcome nonlinear stiction and load type perturbations, but to reduce the integral term prior to the system reaching steady state so as to prevent "wind-up" in the integrator as would produce a subsequent period of steady state error.

The fuzzy rules incorporated in the fuzzy logic may also include a rule to decrease the integral part if the differential feedback signal's magnitude is large but to permit an increased derivative part of the process input signal to counter the change in the process output signal.

It is thus another object of the invention to provide a self-depleting integral portion of the process input signal. When the rate of change of feedback is high, the differential action signal is reduced by the differential feedback signal thus putting a brake on the system and the integral term is reduced preventing wind-up.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

A. Controller Architecture

Figure 1:
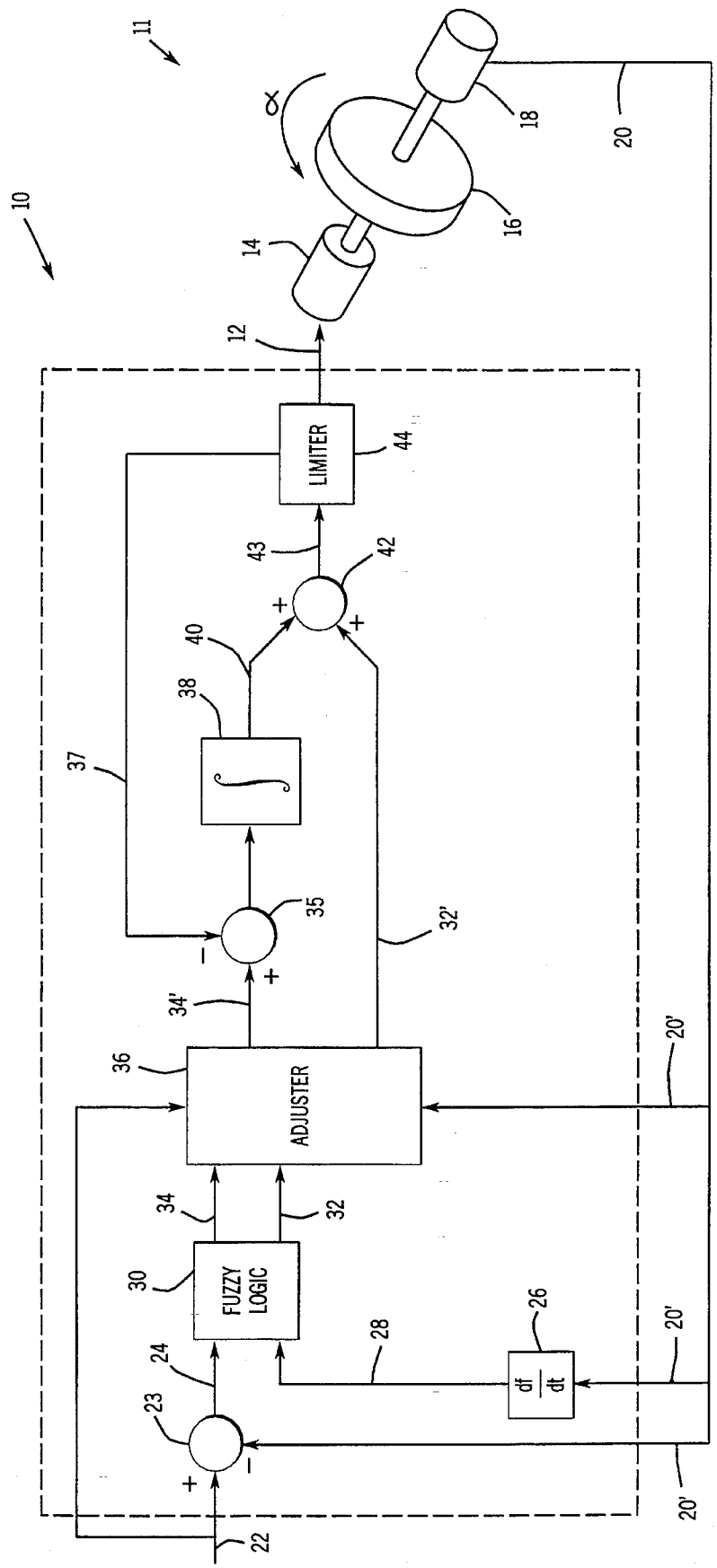
FIG. 1 is a block diagram of a controller useful with the present invention as shown controlling a motor and illustrating the incorporation of the fuzzy logic within the controller architecture.

Referring to FIG. 1, a controller 10 for controlling a process 11, produces a process input signal 12 received by the process 11. The process 11 is in this case a servo motor/amplifier assembly 14 (typically a DC servo motor and a compatible driver amplifier) which converts the process input signal 12 into a torque applied to a mass 16 for turning the same by an angle α. The position of the mass 16 is monitored by a positioning encoder 18 which produces a process output signal 20 proportional to the rotated angle α.

During normal operation, the controller 10 receives a reference input signal 22 representing a desired angle α' to which the mass 16 should be positioned. The controller 10 develops the process input signal 12 so as to drive the motor/amplifier assembly 14 and the mass 16 so that the angle α of the mass 16 matches the angle α' indicated by the reference input signal 22.

The controller 10 also receives the process output signal 20 as a feedback signal 20', first at summing junction 23 which subtracts the process output signal 20 from the reference input signal 22 to produce an ERROR signal 24, second at differentiator 26 which receives the process output signal 20 to produce a Δ-FEEDBACK signal 28, and third at adjuster 36 to be described further below.

In a second embodiment, the differentiator 26 may receive the ERROR signal 24 rather than merely the process output signal 20, a substitution that is well known in the art. In either case the differentiator 26 operates on a function of the process output signal 20.

A fuzzy logic processor 30 receives the ERROR signal 24 and the Δ-FEEDBACK signal 28 to produce two signals: a proportional action signal 32 (PRO-ACTION) and a differential action signal 34 (Δ-ACTION) based on a set of fuzzy membership functions and fuzzy rules as will be described below. The Δ-ACTION signal 34 will in general be a function both of the ERROR signal 24 and of the Δ-FEEDBACK signal 28 and thus contains elements of both P- and D-gain terms found in a typical PID controller. Likewise, the PRO-ACTION signal 32 is in general a function of both the ERROR signal 24 and the Δ-FEEDBACK signal 28 and therefore also contains elements of the P- and D-gain terms of a conventional PID controller.

The PRO-ACTION signal 32 and the Δ-ACTION signal 34 may be received an adjuster 36 which also receives the reference input signal 22 and/or the process output signal 20 to produce an adjusted PRO-ACTION signal 32' and an adjusted Δ-ACTION signal 34' to provide gain scheduling or feed forward as may be desired and selected by the user. The operation of the adjuster 36 will be described below. In one mode of operation, the adjuster 36 simply passes the PRO-ACTION signal 32 and Δ-ACTION signal 34 through without change so that signal 34' equals signal 34 and signal 32' equals signal 32. Thus, in the simplest embodiment, the adjuster 36 may be effectively eliminated.

The adjusted Δ-ACTION signal 34' may be added at summing junction 35 to a limiting signal 37, to be described below, and integrated by integrator 38 to produce an integrated differential action 40. The value of the limiting signals 37, in a simplest embodiment is constant and zero. After the integration of integrator 38, the integrated Δ-ACTION signal 34' contains P- and I-gain terms analogous to those of conventional PID controller.

This integrated Δ-ACTION signal 34' is next summed with the adjusted PRO-ACTION signal 32' at summing junction 42 to produce a control signal 43. After the integration of integrator 38 and summing junction 42 the control signal 43 includes a P, I and D term in a manner analogous to a PID controller. However, the proposed invention, as described in detail in section C below, works better than the standard PID controller.

The control signal 43 is then received by a limiter 44 to become the process input signal 12. The limiter 44 monitors the amplitude of the control signal 43 output from the summing junction 42 and if the control signal 43 exceeds a predetermined upper limit or is less than a predetermined lower limit, the limiter 44 takes the difference, to create limiting signal 37, and subtracts limiting signal 37 from the adjusted Δ-ACTION signal 34 to reduce the output of integrator 38.

The controller 10 as generally described above is preferably implemented in software, according to methods well known in the art, and run on a digital computer. Process input signal 12 is converted to an analog signal by a high speed digital to analog converter (not shown) and the feedback signal 20' and reference input signal 22 are converted to digital signals by analog to digital converters (also not shown). Nevertheless, it will be recognized to those of ordinary skill in the art that each of the blocks of controller 10 may be implemented by discrete circuitry.

B. Fuzzy Logic Processor

Figure 2:
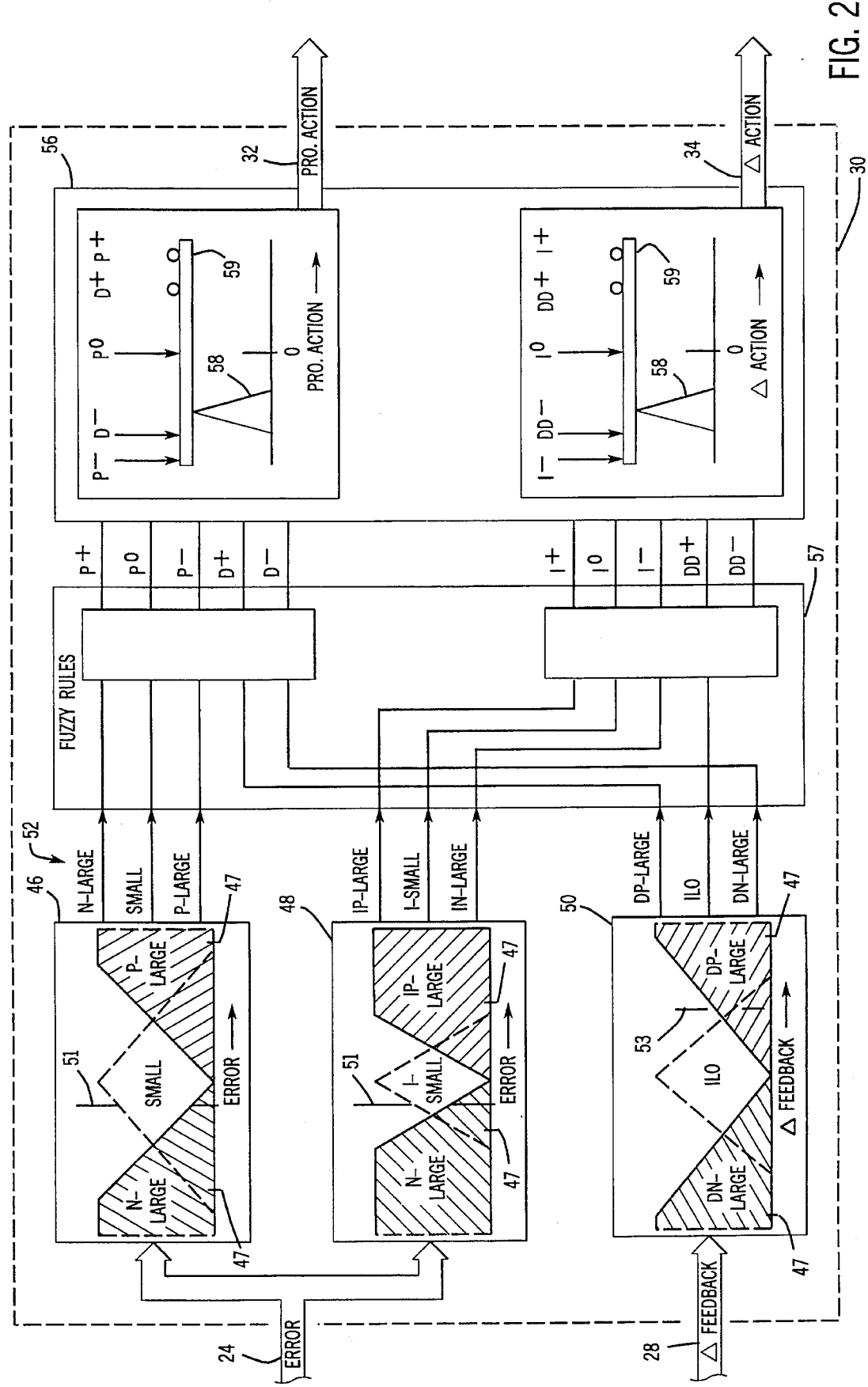
FIG. 2 is a schematic representation of the fuzzy logic of FIG. 1 showing the input membership functions for receiving an error and a differential feedback signal and producing a proportional action signal and a differential action signal.

Referring now to FIG. 2, the fuzzy logic processor 30, also implemented in software, receives the ERROR signal 24 and the Δ-FEEDBACK signal 28 as digital words. In the first step implemented by the fuzzy logic processor 30, the ERROR signal 24 is received by a proportional membership function set 46 and an integral membership function set 48 so named because they contribute to the P and I terms respectively. Each membership function set has a domain which spans the expected range of the error signal and a normalized range between zero and one. The domain is flanked by a negative and positive domain limit 47 which serve as reference points against which the individual membership functions are defined.

The proportional membership function set 46 comprises three membership functions designated N-LARGE, SMALL and P-LARGE corresponding generally to the fuzzy concepts of: large-negative, small and large-positive values of error. Each membership function and the number of membership functions may be varied as understood by those of ordinary skill in the art but in the preferred embodiment herein described, the membership functions are triangular in shape with the SMALL membership function rising from a value of zero for negative arguments of error at the negative-most domain limit 47 and rising to a value of one for error arguments of zero and falling again to a value of zero for positive arguments of error at the positive-most domain limit of the proportional membership function set 46. The SMALL membership function is symmetric about error values of zero.

The N-LARGE membership function ranges linearly from a value of one, for error arguments that are negative and at the extreme negative domain limit 47 of the proportional membership function set 46, to a value of zero for error arguments of zero. The P-LARGE membership function is simply the mirror image of the N-LARGE membership function as reflected about a line of zero error.

In operation, for a given value of ERROR signal 24, the proportional membership function set 46 provides three membership values 52, one for each of the membership function sets of N-LARGE, SMALL, and P-LARGE and named correspondingly, whose exact values depend on the value of each membership function for the given error argument. As shown in FIG. 2, if an error argument 54 is somewhat negative, the value of P-LARGE will be zero, whereas values of SMALL and N-LARGE would be greater than zero and less than one. The proportional membership function set 46 thus permits a continuous ERROR signal 24 to be categorized according to the fuzzy concepts of "large negative", "small" "large positive".

As mentioned, the ERROR signal 24 is also received by the integral membership function see 48 having three membership functions IN-LARGE, I-SMALL AND IP-LARGE. The integral membership function set 48 in general is different from the proportional membership function set 46 but as shown also divides the error into three categories. The I-SMALL membership function is again a triangular function centered around an argument of zero error and ranging from a value of one, at zero error, to values of zero at a user defined negative or positive domain limits 47. The IN-LARGE membership function like the N-LARGE membership function, previously described, proceeds from a value of zero at error arguments equal to zero and increases to values of one for error arguments at the negative domain limit 47. In this example, the IP-LARGE membership function is simply the mirror image of the IN-LARGE membership function as reflected about a line through error arguments of zero.

The integral membership function set 48 also produces three membership values 52 each depending on the degree to which the particular error falls within any individual membership functions and as named according to the individual membership functions. In the example shown, where an error argument 51 is slightly negative, the IP-LARGE value would be zero since the negative error shown does not fall within the domain of the IP-LARGE membership function. The IN-LARGE and I-SMALL membership functions would both have a nonzero values.

The Δ-FEEDBACK signal 28 is received by a differential membership function set 50 similar to the membership function sets 46 and 48 described above. In this example, the differential membership function set 50 has a DN-LARGE membership function substantially the same as the N-LARGE membership function described with respect to proportional membership function set 46 and an ILO membership function essentially the same as the SMALL membership function described above with respect to the proportional membership function set 46 and a DP-LARGE membership function set essentially the same as the P-LARGE membership function set described above with respect to the proportional membership function set 46. The differential membership function set 50 accordingly produces three values, one for each of its constituent membership functions depending on the Δ-FEEDBACK signal 28 presented to the membership function. In this case where a Δ-FEEDBACK signal 53 is indicated to be slightly positive, the DN-LARGE value would be zero and the ILO and DP-LARGE values would be some value between zero and one.

Each membership function set 46, 48 and 50 maps the values of the ERROR signal 24 and the Δ-FEEDBACK signal 28 to one or more output membership values 52. These membership values 52 are in turn linked via fuzzy rules 57 to one or more output membership functions which combine to form the desired output signals of PRO-ACTION 32 and Δ-ACTION 34 according to fuzzy logic rules provided in Table I below. The fuzzy rules 57 effectively mix together the membership values 52 generated by ERROR signals 24 and membership values 52 generated by the Δ-FEEDBACK signal 28 to create each of the output signals of PRO-ACTION 32 and Δ-ACTION 34.

TABLE I

| FUZZY RULE |
| --- |
| 1. ERROR is P-LARGE then PRO-ACTION is $P^+$ |
| 2. If ERROR is N-LARGE then PRO-ACTION is $P^-$ |
| 3. If ERROR is SMALL, then PRO-ACTION is $P^0$ |

TABLE I-continued

FUZZY RULE

4. If ERROR is IP-LARGE, and Δ-FEEDBACK is ILO then Δ-ACTION is I⁺
5. If ERROR is IN-LARGE, and Δ-FEEDBACK is ILO then Δ-ACTION is I⁻
6. If ERROR is I-SMALL and Δ-FEEDBACK is ILO then Δ-ACTION is I⁰
7. If Δ-FEEDBACK is DP-LARGE then PRO-ACTION is D⁺ and Δ-ACTION is DD⁻
8. If Δ-FEEDBACK is DN-Large then PRO-ACTION is D⁺ and Δ-ACTION is DD⁺

In table I the terms: $P^+$, $P^0$, $P^-$, $I^+$, $I^0$, $D^-$, $DD^-$, $D^+$ and $DD^+$ are the output membership functions and are in general, similar to the input membership functions, although they need not be so constrained. Only the center of mass of the output membership functions need be known, as a result of the center-of-mass procedure that is used in the present invention to combine or "de-fuzzify" the competing output membership functions. Accordingly, the output membership functions can be represented schematically as point masses having a magnitude (weight) indicated by the length of an associated vector and a position in one dimension indicated by location along a balanced beam 59. Other de-fuzzification methods can be applied similarly.

Each fuzzy rule of Table I associates a membership value 52 (such as P⁻LARGE) with one or more an output membership functions (such as P⁺) and associates those output membership functions with a output signal (such as PRO-ACTION).

The membership values 52, which indicate the degree to which the input values such as ERROR "fit" within each fuzzy category (such as P-LARGE) are used to scale the output membership function (e.g., P⁺). For example, in FIG. 2, where the ERROR argument to the proportional membership function set 46 is slightly negative, the membership value 52 for P-LARGE of fuzzy rule 1 is zero. Therefore, the P+ output membership function is weighted by the value of zero thus has zero weight as indicated in FIG. 2 by a point having no magnitude. The values of N-LARGE and SMALL are nonzero and therefore the weights of the output membership functions P⁻ and P⁰ are also nonzero as indicated in FIG. 2 by vectors of finite length.

As mentioned, the merging of the competing scaled output membership functions to produce the signals PRO-ACTION 32 and Δ-ACTION 34 is also provided by the rules. For example the output membership functions of P⁺, P⁰, P⁻, D⁻, and D⁺ all contribute to the signal PRO-ACTION per fuzzy rules 1–3, 7, and 8. The values of each non-zero weighted output membership function are combined and their center of mass provides the defuzzified values for PRO-ACTION signal 32

In the example of FIG. 2, the membership value of Δ-FEEDBACK signal 28 in DN-LARGE is zero and thus the contribution to the PRO-ACTION signal from rule 8 is essentially eliminated by a weighting of the output membership function D⁺ as zero, however, because the membership value of DP-LARGE for differentiated feedback is not zero the output membership function of D⁻ is given weight.

Together, the output membership functions thus weighted are evaluated to find their combined center of mass in a defuzzification block 56. The determination of the center of mass of the weighted centers of masses of the output functions is indicated by the position of a fulcrum 58 shown in the present example displaced to a position between the centers of masses of the P⁻, D⁻ and P⁰ output functions so as to find a theoretical balance of beam 59. The position of this hypothetical fulcrum 58 is the value of the PRO-ACTION signal 32.

The Δ-ACTION signal 34 is also generated by combining the output functions I⁺, I³¹, I⁰, DD⁻, and DD⁺ according to rules 4–8 in a manner similar to that described above. Fuzzy rules 4 through 6 differ from the other fuzzy rules in that they employ the conjunction "and" which is interpreted in the context of this fuzzy logic controller 10 as taking the minimum value of the two membership values 52 connected by the word "and". Thus, in fuzzy rule 4, the smaller of the membership value of ERROR signal 24 in IP-LARGE and of the membership value of Δ-FEEDBACK signal 28 in ILO is taken as the argument by which the output membership functions associated with that fuzzy rule are scaled.

The exact shape of the input and output membership functions and their number within each membership function set may be adjusted according to principles understood in the art. In the simplest embodiment, there are three membership functions in each membership function set, having the triangular shapes described above where the domain limits 47 defining the triangular shapes create an interval just spanning the expected inputs signals or the desired output range.

Generally, the output membership functions associated with given input membership functions must observe the algebraic sign conventions described above, that is, the N-LARGE membership function, which has a domain that is less than zero, maps to an output membership function P⁻ that is also less than zero with respect to the PRO-ACTION signal to ensure stability in the control system.

C. Operation of the Fuzzy Rules

Figure 4:
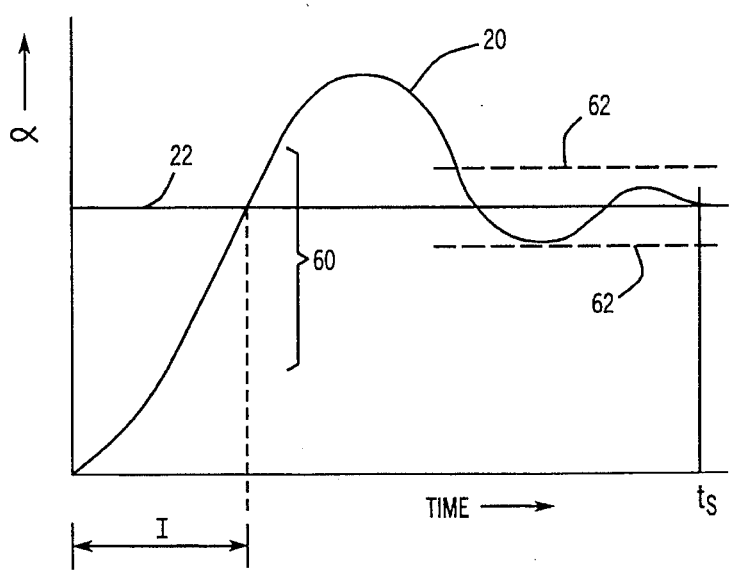
FIG. 4 is a graph of an example response of the motor of FIG. 1 to a step input showing the different stages relevant to the rules of the fuzzy logic of the controller of FIG. 1.

Referring now to FIG. 4, when a step input reference input signal 22 of an α value is first presented to the controller 10, a feedback signal 20' is generated causing the angle α of the mass 16 to change to equal the reference signal at a steady state time $t_s$. Prior to $t_s$, the mass 16 is oscillating about that level α depending on the dynamics of the control system and the mass 16.

The operation of fuzzy rules 1–3 creates an essentially conventional proportional gain in the controller 10 such that the greater the ERROR signal 24, the greater the correction of the process input signal 12. Thus, in response to a step reference input signal 22, the process output signal 20 rises to reduce the value of ERROR in region I.

Fuzzy rules 4–6 control the Δ-ACTION 34 signal and thus the integral and proportional portions of the contribution to the final process input signal 12. Generally these fuzzy rules reflect that fact that if the rate of change of the Δ-FEEDBACK 28 is small (ILO), then the Δ-ACTION 34 signal, and hence the integral term, generally follows the ERROR signal 24. This allows the control system to overcome nonlinear stiction and load in the system. Further when the system is near steady state indicated by range 62, and thus the Δ-FEEDBACK 28 signal is small, the integral portion of the process input signal 12 is free to increase, following the ERROR signal 24, to bring the system to zero error. Conversely, however, when the system is in a dynamic state as indicated by section 60 of the curve of process output signal 20, the integral contribution to the process input signal 12 is reduced to prevent wind-up problems, that is, a large accumulated integral value that prevents settling of the system to its final value.

Fuzzy rules 7 and 8 provide the derivative portion of the process input signal 12 and also introduce a self-depleting integral term. When the rate of change of the feedback is high, the derivative portion of the process input signal 12 is made high (to put a brake on the system) and the integral portion is decreased to prevent future wind-up. This feature also limits the rate of change of the process input signal 12 which may be important in certain situations such as in a temperature controller where the rate of temperature change affects thermal stress.

D. The Adjuster

Referring again to FIG. 1, the adjuster 36 may be used to provide gain scheduling and feed-forward by making use of the reference input signal 22 or the process output signal 20. In general, the adjusted PRO-ACTION signal 32' will equal a first proportionality value times the PRO-ACTION signal 32 plus an offset value, the offset and proportionality values being a function either of the reference input signal 22 or the feedback signal 20' as will be understood to those of ordinary skill in the art.

Likewise the adjusted Δ-ACTION signal 34' will be a second proportionality value times the Δ-ACTION signal 34 plus an offset again each by either the feedback signal 20 or the reference input signal 22.

E. Gain Adjustment

Figure 3A:
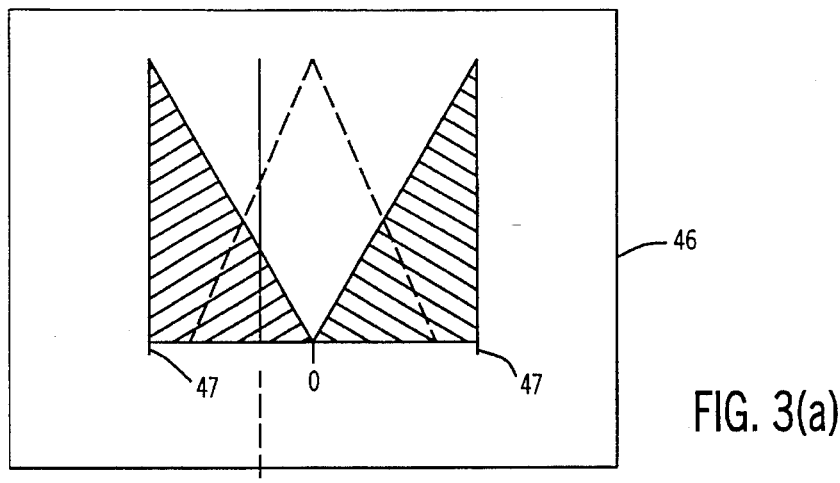
FIGS. 3(a) and (b) are membership functions having compressed and expanded domains such as may be used to adjust the gain of the controller of FIG. 1.
Figure 3B:
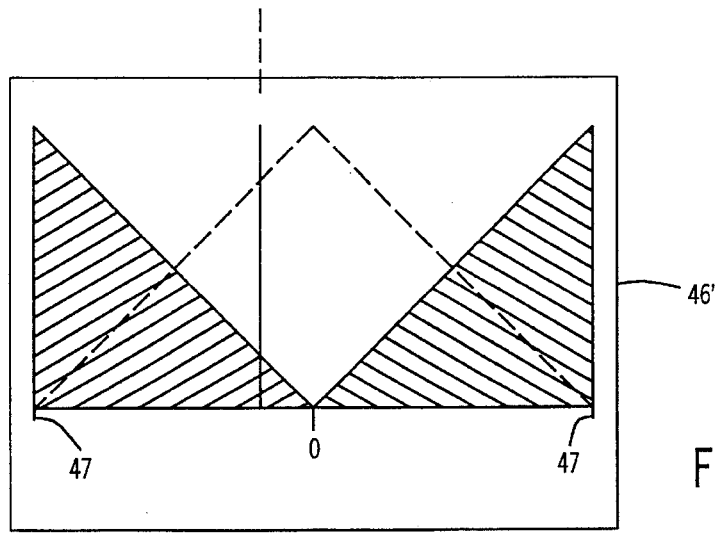

Referring now to FIGS. 3(a) and 3(b), the controller 10 may require tuning to the particular process 11 being controlled. For example, depending on the dynamics of the mass 16, different emphasis will want to be given to the proportional, integral and derivative components making up the process input signal 12. In a traditional PID controller, this adjustment was made by adjusting the gains of the three components directly.

While fuzzy logic may be adjusted by redefining the membership functions and possibly also redefining the fuzzy rules, such redefinition is unwieldy and counter to the goal of allowing a rapid interactive tuning of the system in operation as is normally desired. Accordingly, in the present invention, such tuning is provided by permitting a scaling of the domain of the membership function sets 46, 48 and 50 to expand or contract of their overall domains. Referring to FIG. 3(a), the domain of the membership function set 46 is expanded by changing the domain limits 47 relative to the input values of the membership function. Provided that the membership function is defined with respect to the domain limits 47 (i.e. the vertices of the triangular functions are expressed as percentages of one of the domain limits 47) this scaling of the domain limits effects a uniform compression or expansion of each membership function in the membership function set along the horizontal axis.

The effect of such compression or expansion is to reduce or increase the sensitivity of the fuzzy logic controller to changes in its inputs, either ERROR or Δ-FEEDBACK. The expansion operates uniformly over each constituent membership function of the membership function set thus greatly simplifying a real time adjustment of the fuzzy logic controller by permitting a single expansion factor to be used. This expansion factor may be entered by a user on a display terminal or the like (not shown) or may be reached recursively by the entry of "increment" or "decrement" commands. The particular membership functions to be scaled may be designated by designating an input to the fuzzy logic processor 30. All the membership functions associated with that input are then scaled by the designated amount. This permits the actual membership functions and fuzzy rules to remain invisible to the user. Alternatively, the membership function sets may be designated by predetermined terms such as "P-gain", I-gain" or D-gain". In the preferred embodiment, "D-gain" designates membership function set 46 whereas "I-gain" and "D-gain" designate membership function sets 48 and 50, respectively.

While this invention has been described with reference to particular embodiments and examples, other modifications and variations, such as application to projection reconstruction imaging techniques, will occur to those skilled in the art in view of the above teachings. Accordingly, the present invention is not limited to the preferred embodiment described herein, but is instead defined in the following claims.

We claim:

1. A feedback controller for controlling a process having a process input and process output, the feedback controller receiving a reference input related to a desired process output and producing a process input, the feedback controller comprising:

a comparator for comparing the reference input to the process output to produce an error signal;

a differentiator for differentiating a function of the process output to create feedback difference signal;

fuzzy logic applying a set of fuzzy rules to the error signal and the feedback difference signal to produce a proportional action signal and a differential action signal both being fuzzy functions of both the error signal and the feedback difference signal;

an integrator receiving the differential action signal to produce an integrated action signal; and a summing junction for summing the integrated action signal and the proportional action signal to produce the process input.

2. The feedback controller of claim 1 wherein said fuzzy logic includes means for producing a differential action signal that increases with increases of error signal when the magnitude of the differential feedback is at a predetermined small range and increases with increases of the opposite of the differential feedback signal when the differential feedback signal magnitude is at a predetermined large range larger than the small range.

3. The feedback controller of claim 1 wherein said fuzzy logic includes means for producing a proportional action signal increasing with increases in the error signal and decreasing with increases in the differential feedback signal when the differential feedback signal magnitude is at the predetermined large range.

4. The feedback controller of claim 1 further including an adjuster receiving the reference input and modifying the differential action signal based on the reference input.

5. The feedback controller of claim 1 further including an adjuster receiving the reference input and modifying the proportional action signal based on the reference input.

6. The feedback controller of claim 1 further including an adjuster receiving the process output and modifying the proportional action signal based on the process output.

7. The feedback controller of claim 1 further including a limiter for decreasing the value of the integrated feedback signal in response to the process input exceeding a predetermined magnitude.

8. A method of controlling a process with a fuzzy logic controller, the process having a process input and a process output, comprising the steps of:

receiving a reference input related to a desired process output;

comparing the reference input to the process output to produce an error signal;

differentiating the process output to create feedback difference signal; and applying a set of fuzzy rules to the error signal and the feedback difference signal to produce the process input signal having an integral part, the set of fuzzy rules determining a magnitude of the feedback difference signal and a magnitude of the error signal and selectively permitting change in the integral part based on at least one of said magnitude of the feedback difference signal and said magnitude of the error signal.

9. A method of controlling a process with a fuzzy logic controller, the process having a process input and process output, comprising the steps of:

receiving a reference input related to a desired process output comparing the reference input to the process output to produce an error signal;

differentiating the process output to create feedback difference signal; and applying a set of fuzzy rules to the error signal and the feedback difference signal to produce the process input signal having an integral part, the set of fuzzy rules decreasing the integral part based on an increasing magnitude of the feedback difference signal.

10. A method of controlling a process with a fuzzy logic controller, the process having a process input and a process output, the method comprising the steps of:

receiving a reference input related to a desired process output;

comparing the reference input to the process output to generate an error signal;

differentiating at least one of the error signal and the process output to generate a feedback difference signal; and, applying a set of fuzzy rules to the error signal and the feedback difference signal to generate the process input signal having an integral part.

* * * * *